No. 842,724. PATENTED JAN. 29, 1907.
C. J. TATUM.
SAW FILING MACHINE.
APPLICATION FILED APR. 28, 1906.
2 SHEETS—SHEET 2.
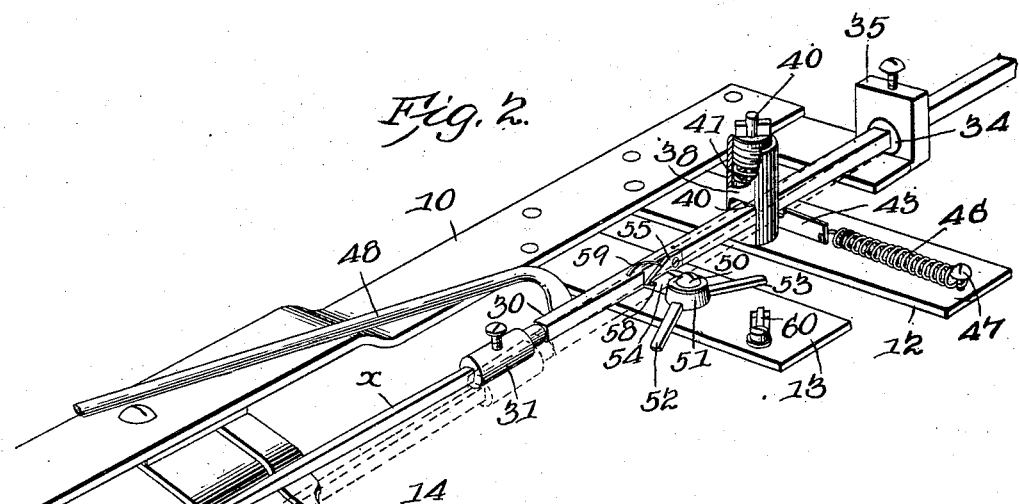
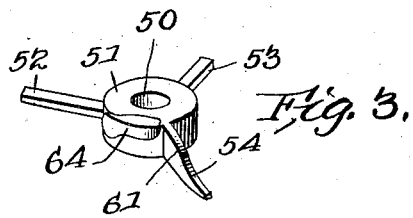
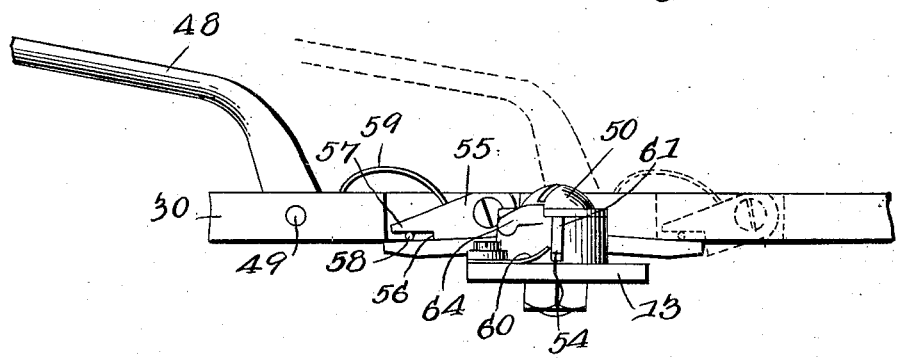
Cicero J. Tatum,
INVENTOR.
WITNESSES:
By
ATTORNEYS

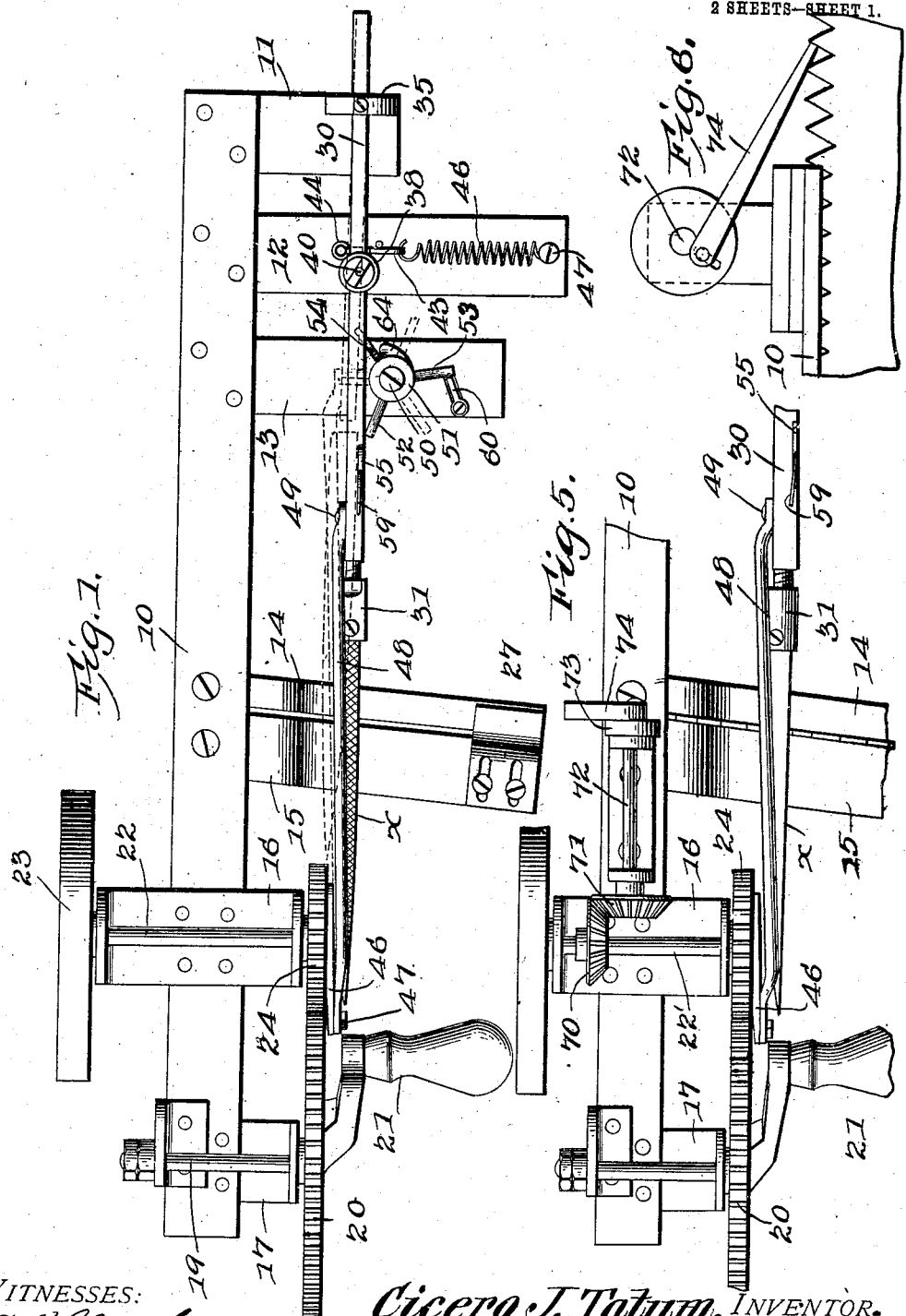

UNITED STATES PATENT OFFICE.

CICERO J. TATUM, OF PORT ARTHUR, TEXAS, ASSIGNOR OF ONE-HALF TO LEMUEL E. DUNN, OF PORT ARTHUR, TEXAS.

SAW-FILING MACHINE.

No. 842,724.      Specification of Letters Patent.      Patented Jan. 29, 1907.

Application filed April 28, 1906. Serial No. 314,204.

*To all whom it may concern:*

Be it known that I, CICERO J. TATUM, a citizen of the United States, residing at Port Arthur, in the county of Jefferson and State of Texas, have invented a new and useful Saw-Filing Machine, of which the following is a specification.

This invention relates to saw-filing machines, and has for its principal object to provide a mechanism of simple construction by which the teeth of saws may be sharpened by a reciprocatory file.

A further object of the invention is to provide a file-carrier and a carrier-operating means which will permit of engagement of the file in each tooth of the saw for a sufficient number of file-strokes to accomplish the sharpening operation, and, further, to provide means for automatically feeding the saw by means of the file, the latter being so arranged that at the completion of each tooth-sharpening operation it will advance the saw to the extent of a single tooth or two teeth, as may be required by the character of the saw to be sharpened.

A still further object of the invention is to provide a file-carrier-operating device which at the completion of the sharpening of each tooth will be raised free of the teeth and then moved down into engagement with the next tooth to be sharpened.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a plan view of a saw-sharpening machine constructed in accordance with the invention. Fig. 2 is a detail perspective view of a portion of the same, illustrating principally the file-carrier and the file-carrier-actuating means. Fig. 3 is a detail perspective view of the cam for controlling the movement of the file-carrier. Fig. 4 is a side elevation of the file-carrier and its controlling-cam. Fig. 5 is a plan view of a portion of the machine, illustrating a slight modification of the invention. Fig. 6 is a detail view of a portion of the mechanism shown in Fig. 5, illustrating the feeding-pawl and its connection.

Similar numerals of reference are employed to indicate corresponding parts throughout the several figures of the drawings.

The working parts of the apparatus are mounted on a suitable frame, which in the present instance includes a main bar 10 and a plurality of bars 11, 12, 13, 14, 15, 16, and 17 supported thereby. The bar 17 is bent to form bearings for the support of a main operating-shaft 19, at one end of which is a gear-wheel 20, that is provided with a handled crank 21, by which the machine is operated. The bar 16 is arranged to form bearings for the support of a counter-shaft 22, having at one end a balance-wheel 23 and at the opposite end a pinion 24, that intermeshes with the teeth of the gear 20, and from this crankshaft movement is imparted to the reciprocatory file-carrier. The two bars 14 and 15 are slightly spaced from each other to permit the passage of the teeth of the saw to be sharpened, and the bar 15 carries a guard 27, that extends over the space between the two bars and is adapted to be engaged by the teeth of the saw.

The file-carrier is in the form of a bar 30, which preferably is of rectangular form in cross-section and is provided at one end with a chuck 31 for the reception of the tang of the file $x$, the latter being usually locked in place by means of a suitable set-screw extending through a threaded opening in one wall of the chuck. The opposite end of the file-carrier extends through a suitably-shaped opening formed in a guiding-block 34, said block being mounted in a spherical socket formed in a bearing-block 35, so that block 34 is free to oscillate within its socket without interfering with the longitudinal reciprocation of the file-carrier. The file-carrying bar also extends through an enlarged slot formed in the lower portion of a standard 38, the area of the opening in the standard being much greater than the cross-sectional area of the file-carrying bar, so that the latter may be free to move both laterally and vertically therein. The standard 38 forms a guide for a vertically-movable pin 40, that is forced down into engagement with the file-carrying bar by means of a spring 41, said spring tending to hold the file down to its work, but at the same time permitting the necessary upward movement when the file has to move up out of the teeth at the completion of the sharpening of each tooth. At a point to one side of the standard 38 is mounted a slide-bar 43, having a suitable notch or recess for the reception of the file-carrying bar, and this slide-bar 43 also carries an antifriction-roller 44, which is held against one face of the file-carrying bar by means of a tension-spring 46, that extends between the guiding-bar and a fixed pin or screw 47, carried by the frame-bar 12. The function of the spring 46 is to hold the file-carrying bar to the right, or with one of its walls in engagement with that wall of the standard-slot nearest the pin 47. This spring 46 is also capable of yielding in order to permit changing of the position of a saw as the latter automatically moves from tooth to tooth.

Secured to and extending from the pinion 24 is a crank 46, the crank-pin 47 of which is connected by a rod 48 to a pin 49 on the file-carrying bar, the parts being so connected as to permit the slight lateral and vertical play of the saw-carrying bar during automatic feeding operation. The two springs 41 and 46 serve to hold the file-carrier in proper position and depress the file against the saw with sufficient force to accomplish the sharpening operation. As a single stroke of the file is not sufficient to sharpen the saw, provision is made for imparting a number of strokes to each tooth before the saw is shifted to present another tooth under the file.

The arm 13 of the frame is provided with a vertically-disposed stud 50, on which is mounted a revoluble block 51, having a number of radially-extending arms, three of which are shown in the present instance. These arms 52, 53, and 54 are arranged to coact with a pivotally-mounted arm 55, that is carried by the bar 30, said arm being disposed within a recess of bar 30 so that its outer face shall remain flush with the side of the bar.

The arm 55 is provided with an abrupt shoulder 56 and a forwardly-extended tongue 57, the tongue being held in contact with a stop-pin 58 by means of a small leaf-spring 59. This arm by engagement with the several arms of the block 51 effects movement of the file for the purpose of feeding the saw in order to permit engagement of the file with the successive teeth. During each forward movement of the file-carrying bar 30 the shoulder 56 engages one of the arms of the block 51 and the latter is rotated, moving through an arc of one hundred and twenty degrees at each operation. The successive arms are engaged and held by a yieldable locking-arm 60, that is carried by the frame-arm 13, the arm 60 yielding in order to permit the passage of the several arms 52, 53, and 54 and then acting to prevent return movement thereof.

The two arms 52 and 53 are of such construction as to permit engagement by the operating-arm 55 without turning or in any manner shifting the position of the file or the file-carrying bar, and the file may make two complete reciprocations and then a partial reciprocation while in contact with each tooth of the saw. When the arm 54 has been moved around to operative position, its cam-like upper face 61 will engage the arm 55, and as a result the file-carrying bar will be shifted from the full-line position shown in Fig. 1 to the dotted-line position of the same figure, and the file will serve to transmit its movement to the saw, so that the latter may be fed in the direction of its length to the extent of one tooth or two teeth in accordance with the character of the saw. This feeding movement of the saw is accomplished against the resistance offered by the spring 46, and after the saw has been moved it then becomes necessary to raise the file until it may engage with the next tooth to be sharpened. For this purpose the cam-face 61 of the arm 54 again comes into operation, and during the advance of the file-carrying bar the abrupt shoulder 56 of the arm 55 engages and turns the arm 54, and the cam-face of the latter passing under the file-carrying bar will elevate the latter, and thus raise the file to a position out of engagement with the sharpened tooth. This feeding movement by the arm 54 is accomplished against the resistance offered by the spring 41, and at the same time the bar is held slightly outward, or in the direction in which it moves in accomplishing the feeding operation, by means of a cam 64, that forms a part of the revoluble block 51 and extends above the top of the arm 54, the function of this cam being to allow the file-carrier to move back gradually to a proper position to present the file in proper position with relation to the saw.

It will be seen that the machine follows in many respects the ordinary hand-filing operation where there is at least two thrusts or cutting movements of the file for each tooth of the saw, and, if necessary, the number of arms for the revoluble block 51 may be increased or diminished in order that a file may remain in engagement with the saw-tooth for a greater or less period of time.

In some cases an auxiliary saw-feeding mechanism may be employed and movement imparted to the saw by a mechanism independent of the file. For this purpose the construction shown in Fig. 5 may be employed. In this case the counter-shaft 22' is provided with a bevel-gear 70, that intermeshes with a gear 71 on a small shaft 72, that is carried by the frame. At the forward end of the shaft 72 is a crank-disk 73, having a crank-pin that supports a small feeding-pawl 74. This pawl is arranged to engage with the teeth of the saw and impart to the latter the necessary feeding movement.

I claim—

1. In a saw-filing machine, a file-carrier, means for reciprocating the same in the same plane a plurality of times, and means for moving the carrier laterally at the completion of a predetermined number of strokes to effect the feeding of the saw through the medium of the file.

2. In a saw-filing machine, a reciprocable file-carrier, means for reciprocating the same, means under the control of the file-carrier for shifting the carrier laterally during its stroke in one direction to effect the feeding of the saw through the medium of the file, and for raising the file-carrier and the file clear of the saw during movement in the opposite direction.

3. In a saw-filing machine, the combination with a reciprocable file-carrier, of means for actuating the same, a revoluble block, a series of equidistantly-spaced arms projecting therefrom, one of said arms forming a cam through which saw-feeding movement is imparted through the medium of the file, a yieldably-mounted arm supported by the file-carrier and serving to engage the successive arms as the carrier is reciprocated, movement of the cam-shaped arm to operative position effecting lateral movement of the file-carrier and feeding of the saw as the carrier moves in one direction, and effecting raising of the file-carrier and the file from the saw as the carrier moves in the opposite direction.

4. In a saw-filing machine, the combination with a frame, of a reciprocable file-carrier, a guide-block having an opening through which the file-carrier is guided, a support on which said block is mounted, a standard having a guiding-slot through which the file-carrier extends, springs tending to hold the carrier in saw-filing position, a revolubly-mounted block adjacent to the carrier, a series of arms radiating from said block, one of said arms being cam-shaped, a yieldable locking-finger for holding the arms from movement in one direction, a yieldably-mounted arm supported by the file-carrier and arranged to engage the successive radial arms, and a cam projecting from the block and arranged to engage against one side of the file-carrier.

In testimony that I claim the foregoing as my own I have hereto affixed my signature in the presence of two witnesses.

CICERO J. TATUM.

Witnesses:
JOSEPH PALICO,
W. E. WILLIAMS.